US012664791B2

(12) United States Patent
Chandran et al.

(10) Patent No.: US 12,664,791 B2
(45) Date of Patent: Jun. 23, 2026

(54) DRIVER FAULT INFLUENCE VECTOR CHARACTERIZATION

(71) Applicant: Intel Corporation, Santa Clara, CA (US)

(72) Inventors: Pravin Chander Chandran, Bengaluru (IN); Raghavendra Bhat, Bangalore (IN); Sean Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 17/856,163

(22) Filed: Jul. 1, 2022

(65) Prior Publication Data

US 2022/0351527 A1 Nov. 3, 2022

(51) Int. Cl.
| | |
|---|---|
| *G06V 20/58* | (2022.01) |
| *B60W 40/09* | (2012.01) |
| *B60W 40/10* | (2012.01) |

(52) U.S. Cl.
CPC ............. *G06V 20/58* (2022.01); *B60W 40/09* (2013.01); *B60W 40/10* (2013.01); *B60W 2420/403* (2013.01); *B60W 2554/4049* (2020.02)

(58) Field of Classification Search
CPC ...... G06V 20/58; B60W 40/09; B60W 40/10; B60W 2420/403; B60W 2554/4049
USPC ........................................................ 348/699
See application file for complete search history.

(56) References Cited

U.S. PATENT DOCUMENTS

| | | | |
|---|---|---|---|
| 10,065,652 B2 | 9/2018 | Shenoy et al. | |
| 10,325,167 B1 | 6/2019 | Chan et al. | |
| 10,777,083 B2 | 9/2020 | Rau et al. | |
| 2017/0200061 A1* | 7/2017 | Julian | G08G 1/04 |
| 2018/0001899 A1* | 1/2018 | Shenoy | G07C 5/008 |
| 2020/0166897 A1* | 5/2020 | Campos | G08G 1/0133 |
| 2021/0110552 A1* | 4/2021 | Bhat | G06T 7/70 |

FOREIGN PATENT DOCUMENTS

| | | |
|---|---|---|
| JP | 2008171141 A | 7/2008 |
| WO | 2019180551 A1 | 9/2019 |

OTHER PUBLICATIONS

Tesla, "Tesla Safety Score", 20 pgs., Sep. 2021.

* cited by examiner

*Primary Examiner* — Asmamaw G Tarko
(74) *Attorney, Agent, or Firm* — Banner & Witcoff, Ltd.

(57) ABSTRACT

An apparatus, including: an interface configured to receive raw images of one or more objects across a timeseries of frames corresponding to a movement event from a perspective of a vehicle of interest (VoI); and processing circuitry that is configured to: track a change in intensity or direction information represented in motion vectors (MVs) generated based on the raw images; generate, based on the change in the intensity or direction information, a weight of an influence vector representing a VoI influence on the movement event; and transmit the weight of the influence vector and an identity of the movement event to an assessment system that is configured to utilize the weight of the influence vector in an assessment of the VoI.

15 Claims, 8 Drawing Sheets

100A
1st Frame 110A
1st Block 120A
2nd Block 100B
2nd Frame 110B
1st Block 120B
2nd Block 100
Successive Frames of Pixel Blocks 200A
Timeseries of Frames of
Degree of Harshness of Braking 200B
Triangular Patterns of
Harshness Degrees Vol Moving to Right Lane: MVs
on all objects are pointed left Vol Moving to Left Lane: MVs
on all objects are pointed right 500
Successive Frames
to Generate Influence Vector Frame n-3
Event = Inward Object Frame n
Influence Vector = External

FIG 4

400
Chart Using Global MV Intensity and
Direction to Infer Events and Classify
Driving Behavior

FIG 6A

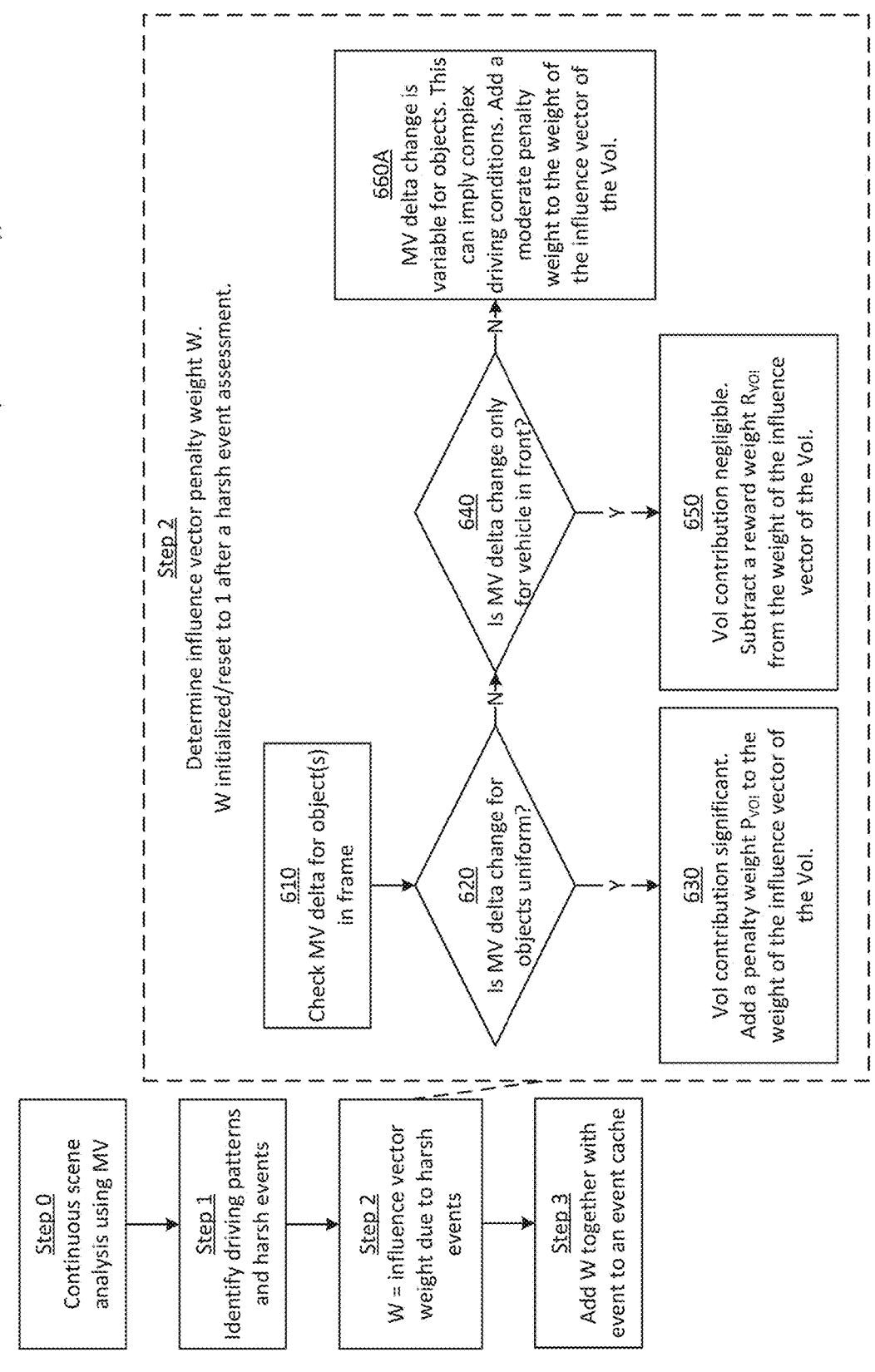

600A
Process for Determining Weight of Influence Vector
(with Camera Only)

Step 2
Determine influence vector penalty weight W.
W initialized/reset to 1 after a harsh event assessment.

610
Check MV delta for object(s) in frame

620
Is MV delta change for objects uniform?

630
VoI contribution significant.
Add a penalty weight $P_{VoI}$ to the weight of the influence vector of the VoI.

640
Is MV delta change only for vehicle in front?

650
VoI contribution negligible.
Subtract a reward weight $R_{VoI}$ from the weight of the influence vector of the VoI.

660A
MV delta change is variable for objects. This can imply complex driving conditions. Add a moderate penalty weight to the weight of the influence vector of the VoI.

Step 0
Continuous scene analysis using MV

Step 1
Identify driving patterns and harsh events

Step 2
W = influence vector weight due to harsh events

Step 3
Add W together with event to an event cache

FIG 6B

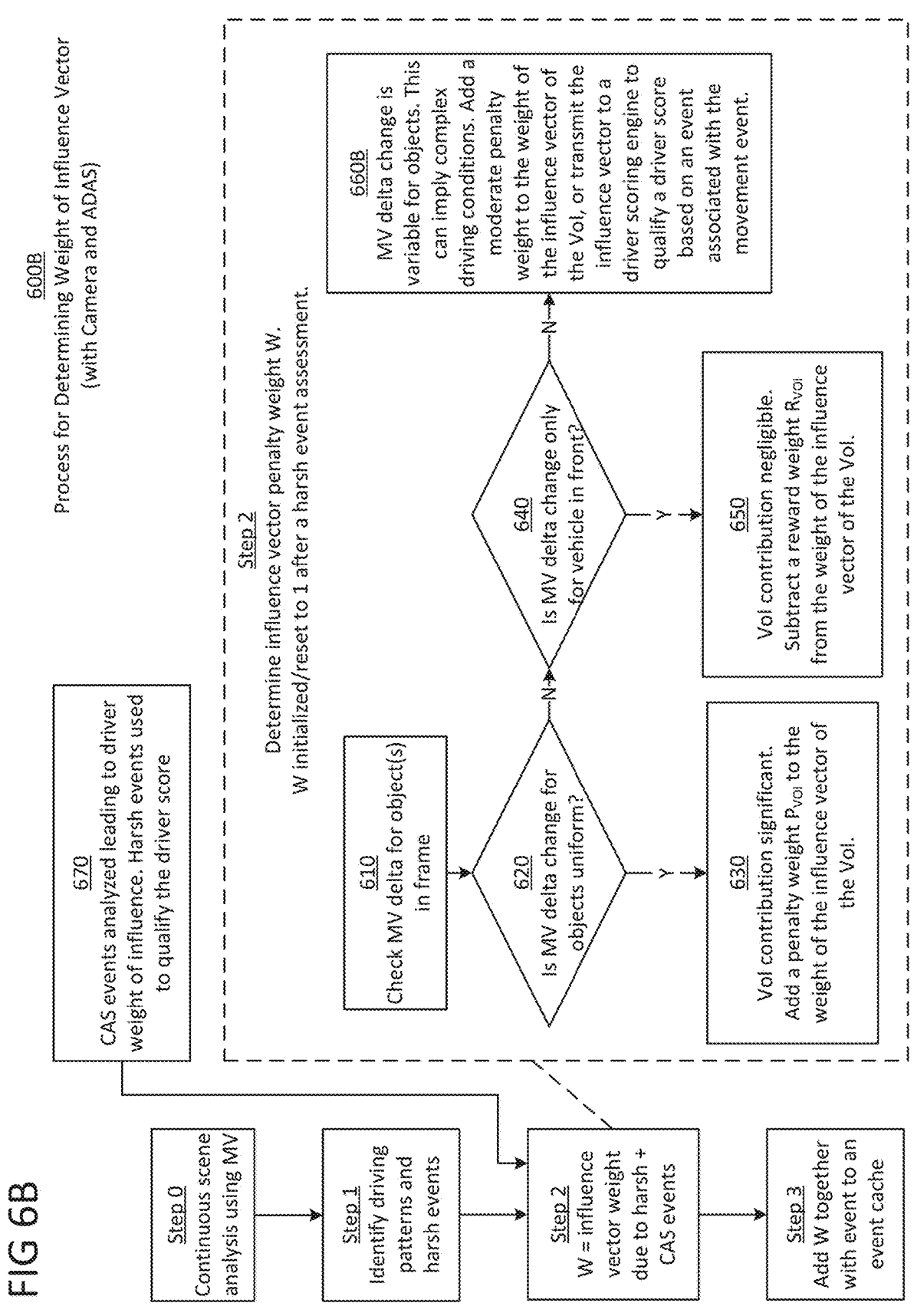

600B
Process for Determining Weight of Influence Vector
(with Camera and ADAS)

Step 2
Determine influence vector penalty weight W.
W initialized/reset to 1 after a harsh event assessment.

610
Check MV delta for object(s) in frame

620
Is MV delta change for objects uniform?

630
VoI contribution significant. Add a penalty weight $P_{VoI}$ to the weight of the influence vector of the VoI.

640
Is MV delta change only for vehicle in front?

650
VoI contribution negligible. Subtract a reward weight $R_{VoI}$ from the weight of the influence vector of the VoI.

660B
MV delta change is variable for objects. This can imply complex driving conditions. Add a moderate penalty weight to the weight of the influence vector of the VoI, or transmit the influence vector to a driver scoring engine to qualify a driver score based on an event associated with the movement event.

670
CAS events analyzed leading to driver weight of influence. Harsh events used to qualify the driver score

Step 0
Continuous scene analysis using MV

Step 1
Identify driving patterns and harsh events

Step 2
W = influence vector weight due to harsh + CAS events

Step 3
Add W together with event to an event cache

900

DRIVER FAULT INFLUENCE VECTOR CHARACTERIZATION

TECHNICAL FIELD

Aspects described herein generally relate to vehicle performance characterization and, more particularly, to characterizing vehicle performance using a vehicle fault influence vector.

BACKGROUND

Vehicle driving performance characterization typically involves extracting information about a driving pattern, such as sudden acceleration, harsh braking, swerving, etc. Existing characterization techniques use a combination of vehicle telematics data and vision systems to classify driving performance characteristics and generate a corresponding driver score. This driver score may be used for vehicle safety assessment for smart-fleets, driver insurance evaluation, etc. Existing solutions determine unsafe Collision Avoidance System (CAS) events using extensive telematics systems and sensors (e.g., radar, lidar, and/or depth sensors), which increase system cost and complexity.

BRIEF DESCRIPTION OF THE DRAWINGS

FIGS. 3A and 33 illustrate successive frames using global motion vector (MV) directionality in accordance with various aspects of the present disclosure.

FIG. 4 illustrates a chart using global MV intensity and direction to infer events and classify driving behavior in accordance with various aspects of the present disclosure.

FIGS. 6A and 6B illustrate flowcharts of a process for determining a weight of the influence vector in accordance with various aspects of the present disclosure.

DESCRIPTION OF THE ASPECTS

I. Overview

This disclosure is directed to characterizing driver behavior by extracting attributes from processed data, such as from motion vectors generated based on raw images. Raw images are not stored for further processing, such as intelligent system training. Privacy is better maintained in that there is no storage of raw images that carry private information, such as license plate numbers.

The driving behavior characterization is extended by an influence vector that differentiates between a scenario in which a driver of a vehicle of interest (VoI) engaging in a bad driving event is at fault, versus a scenario in which the bad driving is in response to an external event beyond the driver's control.

Figures 1, 7:
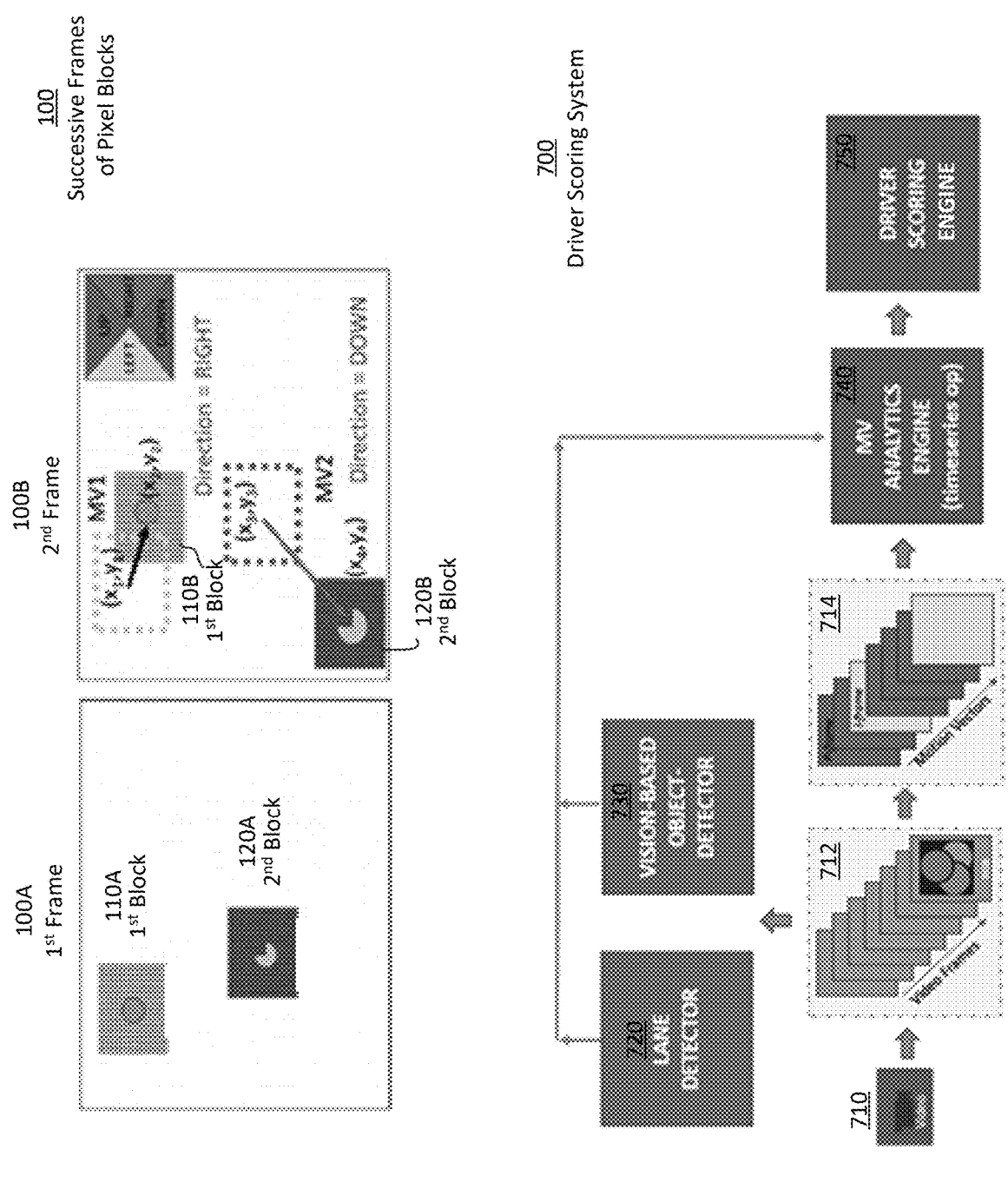
FIG. 1 illustrates successive frames of pixel blocks in accordance with various aspects of the present disclosure.
FIG. 7 is a block diagram of a driver scoring system in accordance with various aspects of the present disclosure.

FIG. 7 is a block diagram of an example of a driver scoring system 700, which is implemented as a heuristic engine, though implementation with an artificial intelligence (AI) system is an alternative. The heuristic engine is configured to analyze intensity and/or direction of motion vectors (MVs) for critical objects and generate relevant triggers for driver scoring. The system 700 combines driving events (e.g., lane change information) from a time series of data, and patterns in a current frame, to generate the influence vector for driver scoring.

The driver scoring system 700 comprises an image sensor (e.g., video camera) 710, a lane detector 720, a vision-based object detector 730, an MV analytics engine 740, and a driver scoring engine 750. The image sensor 710 may be a video camera that is configured to capture a timeseries of image frames 712, from which MVs 714 are generated. The lane detector 720 and the vision-based object detector 730 may use the image frames 712 to detect lanes and objects within a frame. The MV analytics engine 740 is configured to characterize vehicle performance as described in more detail below. And the driver scoring engine 750 may be configured to score along multiple vectors, such as degree of harshness, periodicity of harsh driving, highway versus urban driving, attentiveness to external conditions, behavior during different times of the day, and the like. As an alternative or a complement to image sensor 710 implemented by a camera, a radar sensor, an imaging radar sensor, or a lidar sensor may be used to produce image-like point clouds.

II. Vehicle Performance Characterization

Vehicle performance is characterized based on information represented in motion vectors (MVs) using the following steps:

Step 0—Collect Information from Other Modules of a Driver Assistance System (e.g., an Advanced Driver Assistance System (ADAS))

Prior to characterizing vehicle performance, critical objects, lane markings, and road boundaries within a raw image frame are detected, and then bounding boxes are drawn around the critical objects. This is may accomplished using known motion vector (MV) intensity thresholding and clustering techniques.

For example, ADAS modules (e.g., lane detector 720 and/or vision-based object detector 730) may provide information used to identify regions of interest based on lane markers and road boundaries. Object detection models draw bounding boxes around the critical road objects. Lane information may be tagged on the detected objects to assist in identifying whether an object ahead is in a same lane as a vehicle of interest (VoI) hosting the camera, or in another lane. Also, geotags corresponding to vehicle location may be generated.

As an alternative to the object detection model, the MV analytics engine 740 may detect objects in the frame using intensity-based-thresholding and clustering of high-intensity motion vector (MV) methods. For example, MVs 714 may be created using MV thresholding, MV clustering, and cluster pruning. The MV thresholding step identifies critical MVs 714 based on MV intensity. The MV clustering step groups MVs 714 based on pixel proximity. The cluster pruning step prunes out MVs 714 based on cluster size by dropping clusters that have a number of samples below a predetermined number; a small cluster means the object is at a distance or is too small to be a threat.

Step 1—Identify Driving Patterns using Motion Vectors (MVs)

FIG. 1 illustrates successive frames 100 (712 in FIG. 7) of pixel blocks 110 in video frames.

Two pixel blocks 110A, 120A in a first frame 100A are compared with the same pixel blocks 110B, 120B in a successive second frame 100B. If a pixel block match is found, pixel coordinates, along with displacement, are coded as MVs. In the example shown, the first block 110A moves down and to the right from $(x_1, y_1)$ to $(x_2, y_2)$, as represented by the first motion vector MV1. The second block 120A moves down and to the left from $(x_3, y_3)$ to $(x_4, y_4)$, as represented by the second motion vector MV2.

For each object in the frame, changes in MV intensity (magnitude) and MV direction over a series of frames are tracked. MV intensity captures an amount of displacement of a pixel block 110, 120 between consecutive frames 100A. 100B. MV direction captures a direction in which a pixel block 110, 120 is displaced.

Patterns in MV intensity and direction changes over a set of frames offers insight into driving patterns. The term vehicle of interest (VoI) is used herein to refer to a vehicle for which driver behavior characterization is desired. The intensity and direction changes of MVs over a series of frames 100 are analyzed to identify patterns corresponding to driving movement (1 driving event) such as braking, acceleration, maneuvering, etc. For instance, a steep increase in MV intensity over a fixed number of frames suggests harsh braking or sudden acceleration. The result is a specific intensity pattern that may be used for driver classification. These driving patterns may be identified using a heuristic pattern engine, or alternatively, an artificial intelligence (AI) system.

Figure 2A:
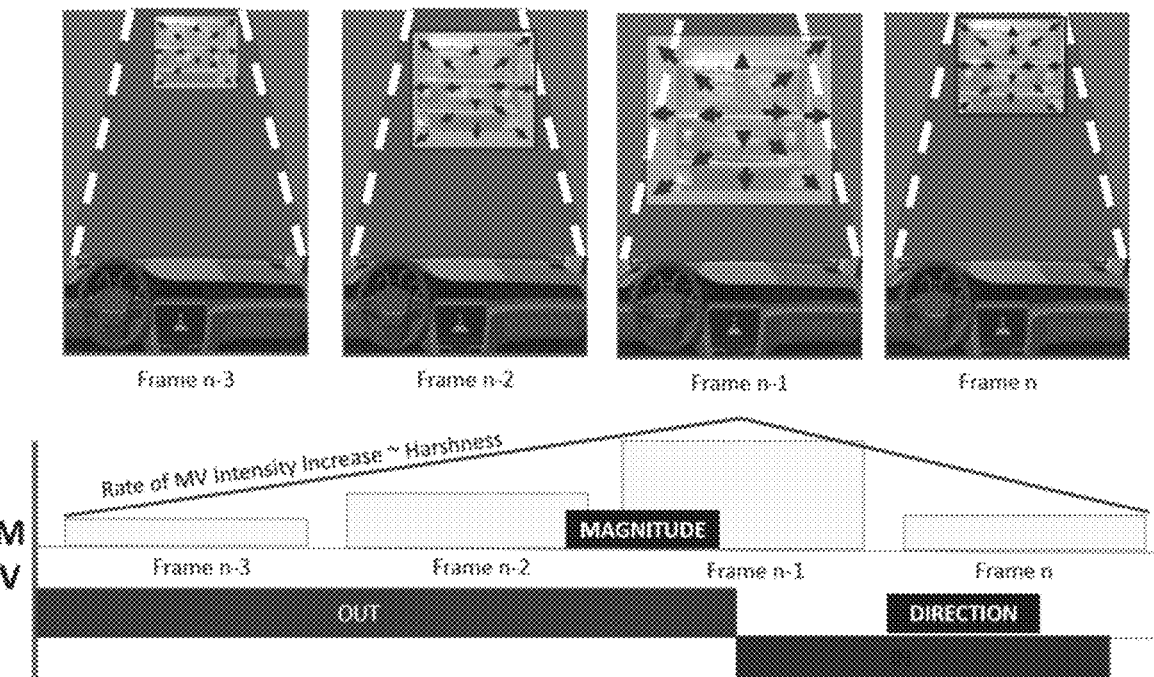
FIG. 2A illustrates a timeseries of frames of a degree of harshness of braking.

FIG. 2A illustrates a timeseries of frames 100A of a degree of harshness of braking. Unsafe acceleration may result in the VoI getting too close to a vehicle in front followed by harsh braking. As the VoI gets closer to the vehicle in front, MV intensity on the vehicle in front will start increasing and will also start pointing outward, as shown in frame n−2. Intensity will peak at the point where both the vehicles are closest to each other (frame n−1) and will either start decreasing if the distance between the vehicles begin to increase after braking (frame n), or alternatively sharply drop to zero if both vehicles come to a complete stop. Such events lead to triangular patterns in MV timeseries data, as shown in the lower graph.

Figure 2B:
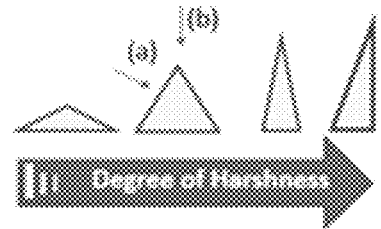
FIG. 2B illustrates triangular patterns of harshness degrees in accordance with various aspects of the present disclosure.

FIG. 2B illustrates triangular patterns of harshness degree 200B. The degree of harshness of braking is estimated from (a) slope of rising edge, and (b) height of MV intensity (magnitude) curve over a fixed set of frames. The rate at which MV intensity increases (i.e., slope of rising edge of triangular pattern) is highly correlated with harshness of braking. Likewise, a maximum height of a triangular pattern is correlated with a distance between vehicles at the time of maximum braking. The attributes of the timeseries of triangular patterns may be used to derive a continuous degree of harshness score rather than simply a good or bad classification score.

Additional information such as camera frame rate, number of frames over which the pattern is formed, speed limit for the road segment etc., can be used to normalize data from different vehicles and road conditions to arrive at a generic scoring model. For instance, triangular patterns which are spread over a large number of MV frames may be ignored as they represent safe acceleration over a considerable period of time as equated by large number of MV frames. A similar pattern will be visible even if the VoI had to brake due to sudden unexpected braking of vehicle ahead. An influence vector that differentiates harsh braking due to a driver's negligence versus external events is described below for Step 2.

Figure 3A:
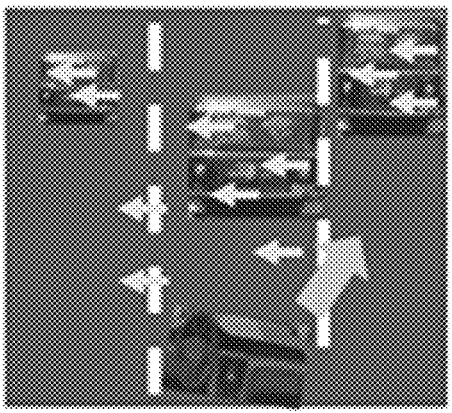
Figure 3B:
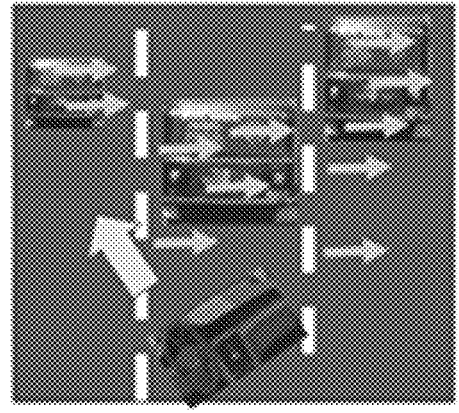

FIGS. 3A and 3B illustrate successive frames using global MV directionality. FIG. 3A illustrates a VoI moving to the right lane, in which case the MVs of all objects are pointed left. FIG. 3B illustrates a VoI moving to the left lane, in which case the MVs of all objects are pointed right. The presence of these global MVs on road objects across multiple frames (occurrence frequency) can serve as a measure of unsafe maneuvering. Unsafe maneuvering, including frequent lane-changes, results in a large number MVs pointing completely left or right on all road objects, as shown.

Figure 4:
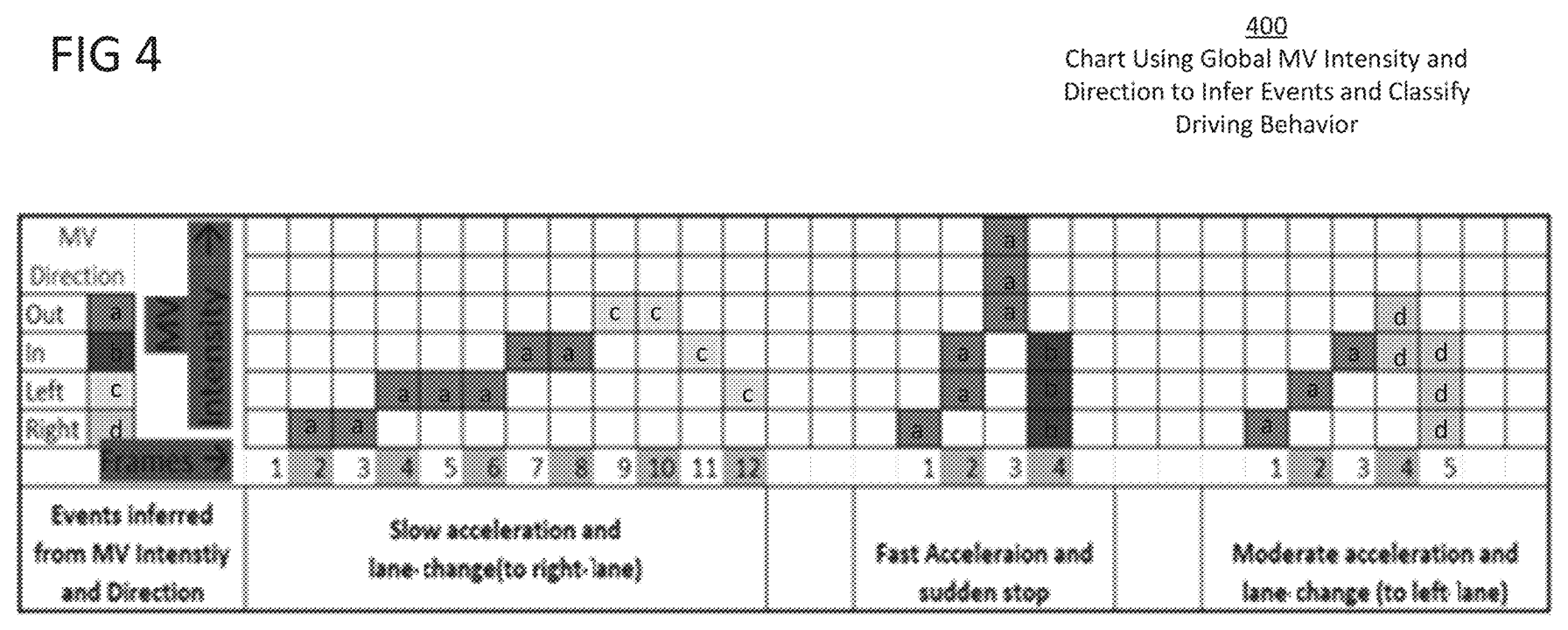

FIG. 4 illustrates a chart 400 using global MV intensity and direction to infer events and classify driving behavior. The events include slow acceleration and lane change to right lane, fast acceleration and sudden stop, and moderate acceleration and lane change to left lane.

C. Step 2—Generate an Influence Vector

An influence vector is generated based on an analysis of a preceding set of events to differentiate bad driving behavior due to driver negligence versus due to external events on the road. For instance, an external event may be harsh braking that was a result of another rash driver that merged into a current lane of the VoI.

Changes in MVs compared to previous frames can be used to identify whether external events are responsible for the harsh braking requirement. For example, if relative position of all vehicles is similar across frames, MV intensity will be relatively small and a change in MV intensity (i.e., difference in MV intensities for the object compared to a previous frame) will be substantially close to zero. If only the VoI has accelerated or decelerated, a change in MV intensity will be visible on MVs of all the objects in the frame. If the VoI is traveling at a constant speed and a vehicle in front of and in the same lane as the VoI has slowed down, the MV intensity change will be very high for only the vehicle in front of the VoI.

Figure 5A:
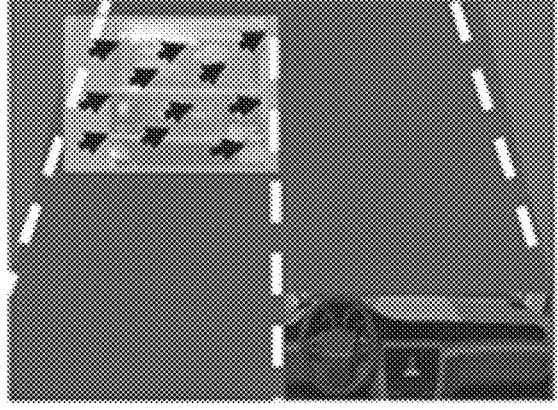
FIGS. 5A and 5B illustrate successive frames to generate an influence vector in accordance with various aspects of the present disclosure.
Figure 5B:
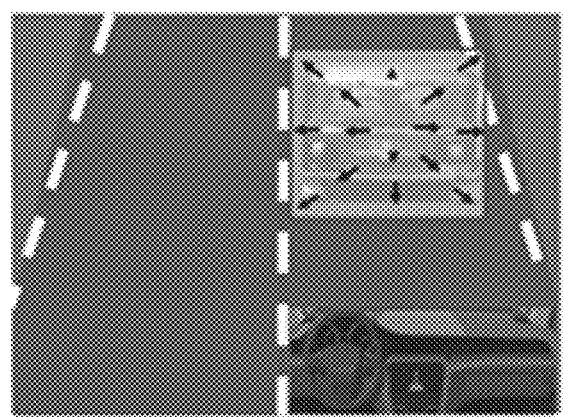

FIGS. 5A and 5B illustrate successive frames to generate an influence vector in the case of a rash driver merging into a current lane. FIG. 5A illustrates MVs on the other vehicle ahead of the VoI in the left lane pointing right when the other vehicle moves to lane on its right. FIG. 5B illustrates MVs on the other vehicle ahead of the VoI pointing outward due to harsh braking by the VoI. Thus if the change in direction information represented in the MVs is substantially completely in a left direction or substantially completely a right direction across the timeseries of frames for the one or more objects, it is determined that the movement event is unsafe maneuvering by the VoI, and a penalty weight is added to the weight of the influence vector representing the VoI influence on the movement event. The history of the lane change event, that is, lane change events recorded from previous timeframes, can be used to determine that the harsh braking was due to an external event.

Generally, if there is the change in intensity information represented in the MVs for each of the one or more objects, it is determined that the movement event is the VoI accelerating or decelerating, and a penalty weight P will be added to the influence vector representing the VoI influence on the movement event.

FIGS. 6A and 6B illustrate flowcharts 600 of a process for determining the influence vector. FIG. 6A illustrates a flowchart 600A of the process for determining the weight of the influence vector using a VoI camera only. FIG. 6B illustrates a flowchart 600B of the process for determining the weight of the influence vector using the VoI camera and also an ADAS system. It is appreciated that the flowcharts 600A, 600B are exemplary in nature, and the disclosure is not necessarily limited to these particular aspects, or the order of the steps.

Step 0 and Step 1, as described above, generate a change in intensity and/or direction information represented in MVs generated based on raw images of one or more objects across a timeseries of frames of a movement event from a perspective of a VoI is tracked. The vehicle may be a car, truck, bicycle, robot, motorcycle, truck, etc. An object may be another vehicle or a robot, pedestrian, animal, etc. The movement event may be braking, acceleration, and/or maneuvering of the VoI and/or of the one or more objects. A harshness of the braking, acceleration, and/or maneuvering corresponds with a rate of the change in the intensity information.

Step 2 is generating an influence vector weight W representing a VoI influence on the movement event is generated based on the change in the intensity and/or direction information.

Step 3 is the weight of the influence vector, together with the event, being transmitted to a storage (e.g., event cache). This storage may be accessible by an assessment system that is configured to utilize the weight of the influence vector in an assessment of the VoI.

Step 2 determines the influence vector penalty weight W. The details are shown in detail inside the dashed box. After a harsh event assessment, the influence vector penalty weight W is initialized or reset to 1.

In generating an influence vector weight W, the MV intensity and/or direction delta is determined for objects in the frame. (Step 610.)

It is subsequently determined if the change in intensity and/or direction information is substantially uniform for the objects across the timeseries of frames (Step 620). If the change is substantially uniform, a penalty weight $P_{VOI}$ is added to the weight W of the influence vector representing the VoI influence on the movement event. (Step 630.)

Alternatively, if the change is not substantially uniform, it is determined if the change is only for an object, of the one or more objects, that is directly in front of the VoI. (Step 640.) If the change is only for the object that is in front of the VoI, the VoI contribution is negligible, so a reward weight $R_{VOI}$ is subtracted from the weight W of the influence vector. (Step 650.)

If the VoI is traveling at a constant speed, it is determined that the movement event is the object that is directly in front of the VoI accelerating or decelerating. When comparing MV intensity change for all objects in a frame, including vehicles in other lanes, it helps identify if there was a slowdown only in a current lane or on all the lanes. A sharp increase in MV intensity in a particular frame for only the vehicle in front of the VoI, compared to other road objects, suggests harsh braking due to an unforeseen slowdown of vehicle in front of the VoI. In such a case a reward weight is subtracted from the weight W of the influence vector representing the VoI influence on the movement event. (Step 650). Alternatively, if the change is not only for the object that is directly in front of the VoI (Step 640), the MV delta change is variable for objects, which implies complex driving conditions. A moderate penalty weight $P_{VOI}$ is added to the weight W of the influence vector representing the VoI influence on the movement event (Step 660A.) The penalty weight $P_{VOI}$ and reward weight $R_{VOI}$ are heuristically determined over time considering geo and peer driver trend on similar events.

FIG. 6B illustrates a flowchart 600B of the process dependent not only on the VoI camera, but also on an ADAS system. Flowchart 600B is similar to the flowchart 600A of FIG. 6A, except that step 670 is added, and there are minor additions (e.g., in step 660) to account for the influence of collision avoidance system (CAS) events.

CAS events are analyzed to determine and use a weight of driver influence to qualify a CAS driver score. In determining the weight W of the influence vector in Step 2, the CAS event is added. (Step 670.) The influence vector may be transmitted to a CAS or a driver scoring engine to qualify the driver score based on an event associated with the movement event. (Step 660B.) The associated event may precede the movement event, or alternatively or additionally, be in sync or after the movement event.

The driving behavior characterization may not only be used to characterize behavior of a manual driver, but additionally or alternatively may be deployed to identify unsafe driving by AI models in autonomous vehicles as well. An AI model can also be scored across multiple-vectors, similar to a human driver, in a continuous manner. The deployment may be for real-time testing as well as for testing models in simulated environments. In addition to the pattern detection-based flow, information from other sensors (including a human driver), which are used to override a response from the AI vision system, can be supplemented to test models. When an unsafe event is detected, images around the frame (both preceding and future frames) can be collected and stored for training future models.

Actual images can be recorded and stored (for review, training, etc.) only when an event that is critical to driver scoring is encountered. For behavior characterization, the raw images can be converted to MV frames and immediately discarded. Since sensitive information (e.g., a license plate number) is not retained in MVs, the result is better privacy controls on the data recording and storage. If the intelligent system is trained directly on MV frames, the need for storing scene data for training etc., can be eliminated.

The aspects of the technique for driver behavior and performance characterization as described herein uses MV data, which has less compute requirements due to the presence of fewer channels in comparison with a vision-based system. The technique is applicable for characterizing human drivers as well as vision-based AI driving systems to significantly improve road safety through continuous validation of vision AI models. A degree of harshness metric is generated instead of a single good/bad classification. An influence vector differentiates between situations where a driver of a VoI is at fault versus situations where external events led to the bad driving behavior, to thereby ensure that the driver is penalized appropriately. Privacy protection and control is provided. While a heuristic engine is described, an intelligent system, such as an AI model, may be trained directly on the MV frames for deployment.

Existing solutions require multi-modal approach where vision sensors are combined with additional sensors. Such an approach adds to system cost and complexity. Vision-based solutions are generally cheaper than multi-sensor solutions. The aspects disclosed herein estimate metrics, such as harshness of braking and acceleration, using MV intensity and direction. There is an independent scene analysis using already-available images without the need for complex and expensive sensors, and also offers better privacy characteristics.

Figure 8:
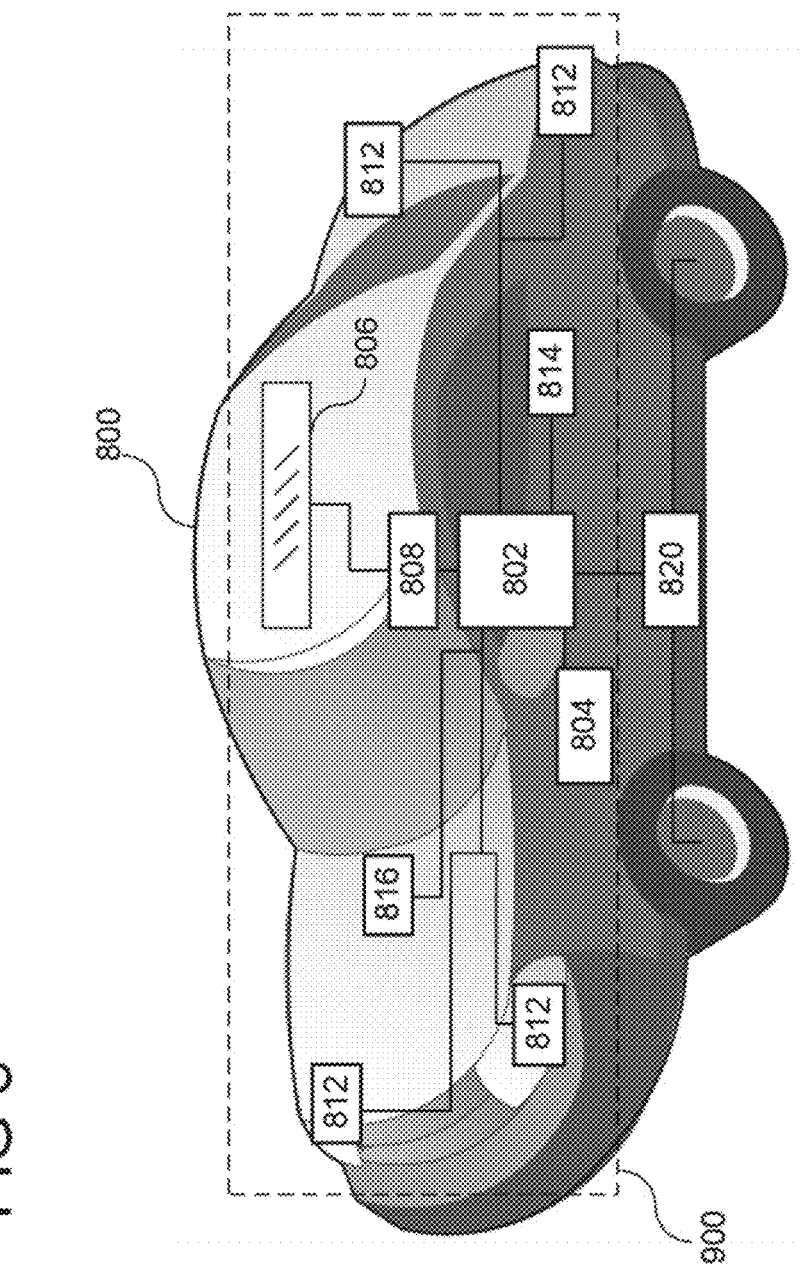
FIG. 8 shows an exemplary autonomous vehicle in accordance with various aspects of the present disclosure.

FIG. 8 illustrates a vehicle 800 including a mobility system 820 and a control system 900 (see also FIG. 9) in accordance with various aspects. It is appreciated that vehicle 800 and control system 900 are exemplary in nature and may thus be simplified for explanatory purposes. For example, while vehicle 800 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 800 may be arranged around a vehicular housing of vehicle 800, mounted on or outside of the vehicular housing, enclosed within the vehicular housing, or any other arrangement relative to the vehicular housing where the components move with vehicle 800 as it travels. The vehicular housing, such as an automobile body, drone body, plane or helicopter fuselage, boat hull, or similar type of vehicular body dependent on the type of vehicle that vehicle 800 is.

In addition to including a control system 900, vehicle 800 may also include a mobility system 820. Mobility system 820 may include components of vehicle 800 related to steering and movement of vehicle 800. In some aspects, where vehicle 800 is an automobile, for example, mobility system 820 may include wheels and axles, a suspension, an engine, a transmission, brakes, a steering wheel, associated electrical circuitry and wiring, and any other components used in the driving of an automobile. In some aspects, where vehicle 800 is an aerial vehicle, mobility system 820 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 800 is an aquatic or sub-aquatic vehicle, mobility system 820 may include any one or more of rudders, engines, propellers, a steering wheel, associated electrical circuitry and wiring, and any other components used in the steering or movement of an aquatic vehicle. In some aspects, mobility system 820 may also include autonomous driving functionality, and accordingly may include an interface with one or more processors 802 configured to perform autonomous driving computations and decisions and an array of sensors for movement and obstacle sensing. In this sense, the mobility system 820 may be provided with instructions to direct the navigation and/or mobility of vehicle 800 from one or more components of the control system 900. The autonomous driving components of mobility system 820 may also interface with one or more radio frequency (RF) transceivers 808 to facilitate mobility coordination with other nearby vehicular communication devices and/or central networking components that perform decisions and/or computations related to autonomous driving.

Figure 9:
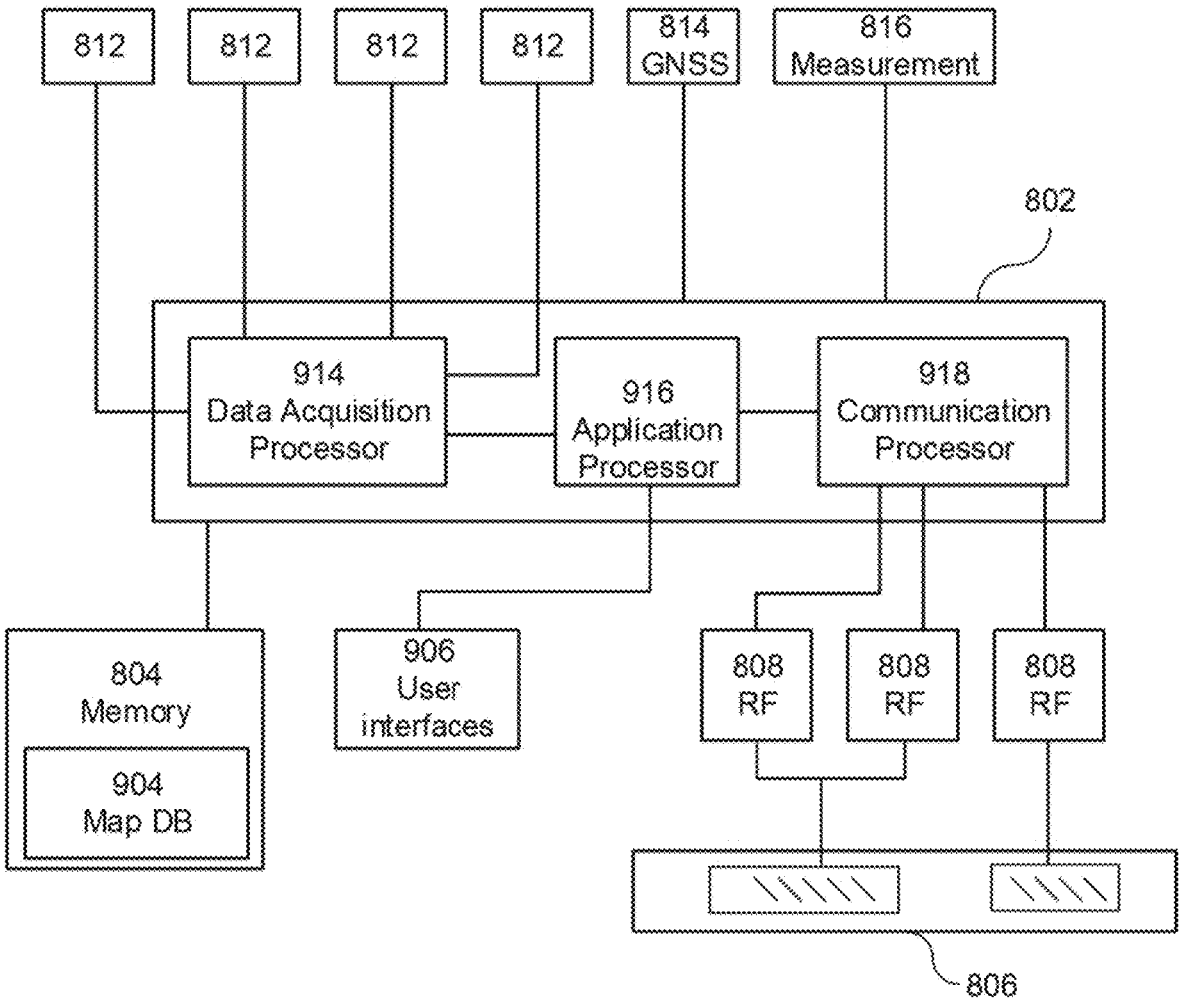
FIG. 9 shows various exemplary electronic components of a safety system of the vehicle in accordance with various aspects of the present disclosure.

The control system 900 may include various components depending on the requirements of a particular implementation. As shown in FIG. 8 and FIG. 9, the control system 900 may include one or more processors 802, one or more memories 804, an antenna system 806 which may include one or more antenna arrays at different locations on the vehicle for radio frequency (RF) coverage, one or more radio frequency (RF) transceivers 808, one or more data acquisition devices 812, one or more position devices 814 which may include components and circuitry for receiving and determining a position based on a Global Navigation Satellite System (GNSS) and/or a Global Positioning System (GPS), and one or more measurement sensors 816, e.g. speedometer, altimeter, gyroscope, velocity sensors, etc.

The control system 900 may be configured to control the vehicle's 800 mobility via mobility system 820 and/or interactions with its environment, e.g. communications with other devices or network infrastructure elements (NIEs) such as base stations, via data acquisition devices 812 and the radio frequency communication arrangement including the one or more RF transceivers 808 and antenna system 806.

The one or more processors 802 may include a data acquisition processor 914, an application processor 916, a communication processor 918, and/or any other suitable processing device. Each processor 914, 916, 918 of the one or more processors 802 may include various types of hardware-based processing devices. By way of example, each processor 914, 916, 918 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 914, 916, 918 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 914, 916, 918 disclosed herein may be configured to perform certain functions in accordance with program instructions which may be stored in a memory of the one or more memories 804. In other words, a memory of the one or more memories 804 may store software that, when executed by a processor (e.g., by the one or more processors 802), controls the operation of the system, e.g., a driving and/or safety system. A memory of the one or more memories 804 may store one or more databases and image processing software, as well as a trained system, such as a neural network, or a deep neural network, for example. The one or more memories 804 may include any number of random-access memories, read only memories, flash memories, disk drives, optical storage, tape storage, removable storage and other types of storage. Alternatively, each of processors 914, 916, 918 may include an internal memory for such storage.

The data acquisition processor 916 may include processing circuitry, such as a CPU, for processing data acquired by data acquisition units 812. For example, if one or more data acquisition units are image acquisition units, e.g. one or more cameras, then the data acquisition processor may include image processors for processing image data using the information obtained from the image acquisition units as an input. The data acquisition processor 916 may therefore be configured to create voxel maps detailing the surrounding of the vehicle 800 based on the data input from the data acquisition units 812, i.e., cameras in this example.

Application processor 916 may be a CPU, and may be configured to handle the layers above the protocol stack, including the transport and application layers. Application processor 916 may be configured to execute various applications and/or programs of vehicle 800 at an application layer of vehicle 800, such as an operating system (OS), a user interfaces (UI) 906 for supporting user interaction with vehicle 800, and/or various user applications. Application processor 916 may interface with communication processor 918 and act as a source (in the transmit path) and a sink (in the receive path) for user data, such as voice data, audio/video/image data, messaging data, application data, basic Internet/web access data, etc. In the transmit path, communication processor 918 may therefore receive and process outgoing data provided by application processor 916 according to the layer-specific functions of the protocol stack, and provide the resulting data to digital signal processor 908. Communication processor 918 may then perform physical layer processing on the received data to produce digital baseband samples, which digital signal processor may provide to RF transceiver(s) 808. RF transceiver(s) 808 may then process the digital baseband samples to convert the digital baseband samples to analog RF signals, which RF transceiver(s) 808 may wirelessly transmit via antenna system 806. In the receive path, RF transceiver(s) 808 may receive analog RF signals from antenna system 806 and process the analog RF signals to obtain digital baseband samples. RF transceiver(s) 808 may provide the digital baseband samples to communication processor 918, which may perform physical layer processing on the digital baseband samples. Communication processor 918 may then provide the resulting data to other processors of the one or more processors 802, which may process the resulting data according to the layer-specific functions of the protocol stack and provide the resulting incoming data to application processor 916. Application processor 916 may then handle the incoming data at the application layer, which can include execution of one or more application programs with the data and/or presentation of the data to a user via one or more user interfaces 906. User interfaces 906 may include one or more screens, microphones, mice, touchpads, keyboards, or any other interface providing a mechanism for user input.

The communication processor 918 may include a digital signal processor and/or a controller which may direct such communication functionality of vehicle 800 according to the communication protocols associated with one or more radio access networks, and may execute control over antenna system 806 and RF transceiver(s) 808 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 800 shown in FIGS. 8 and 9 may depict only a single instance of such components.

Vehicle 800 may transmit and receive wireless signals with antenna system 806, which may be a single antenna or an antenna array that includes multiple antenna elements. In some aspects, antenna system 902 may additionally include analog antenna combination and/or beamforming circuitry. In the receive (RX) path, RF transceiver(s) 808 may receive analog radio frequency signals from antenna system 806 and perform analog and digital RF front-end processing on the analog radio frequency signals to produce digital baseband samples (e.g., In-Phase/Quadrature (IQ) samples) to provide to communication processor 918. RF transceiver(s) 808 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 808 may utilize to convert the received radio frequency signals to digital baseband samples. In the transmit (TX) path, RF transceiver(s) 808 may receive digital baseband samples from communication processor 918 and perform analog and digital RF front-end processing on the digital baseband samples to produce analog radio frequency signals to provide to antenna system 806 for wireless transmission. RF transceiver(s) 808 may thus include analog and digital transmission components including amplifiers (e.g., Power Amplifiers (PAs), filters, RF modulators (e.g., RF IQ modulators), and digital-to-analog converters (DACs), which RF transceiver(s) 808 may utilize to mix the digital baseband samples received from communication processor 918 and produce the analog radio frequency signals for wireless transmission by antenna system 806. In some aspects, communication processor 918 may control the radio transmission and reception of RF transceiver(s) 808, including specifying the transmit and receive radio frequencies for operation of RF transceiver(s) 808.

According to some aspects, communication processor 918 includes a baseband modem configured to perform physical layer (PHY, Layer 1) transmission and reception processing to, in the transmit path, prepare outgoing transmit data provided by communication processor 918 for transmission via RF transceiver(s) 808, and, in the receive path, prepare incoming received data provided by RF transceiver(s) 808 for processing by communication processor 918. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 800 may be configured to operate according to one or more radio communication technologies. The digital signal processor of the communication processor 918 may be responsible for lower-layer processing functions (e.g., Layer 1/PHY) of the radio communication technologies, while a controller of the communication processor 918 may be responsible for upper-layer protocol stack functions (e.g., Data Link Layer/Layer 2 and/or Network Layer/Layer 3). The controller may thus be responsible for controlling the radio communication components of vehicle 800 (antenna system 806, RF transceiver(s) 808, position device 814, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 800 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 800 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 918 may include executable instructions that define the logic of such functions.

In some aspects, vehicle 800 may be configured to transmit and receive data according to multiple radio communication technologies. Accordingly, in some aspects one or more of antenna system 806, RF transceiver(s) 808, and communication processor 918 may include separate components or instances dedicated to different radio communication technologies and/or unified components that are shared between different radio communication technologies. For example, in some aspects, multiple controllers of communication processor 918 may be configured to execute multiple protocol stacks, each dedicated to a different radio communication technology and either at the same processor or different processors. In some aspects, multiple digital signal processors of communication processor 918 may include separate processors and/or hardware accelerators that are dedicated to different respective radio communication technologies, and/or one or more processors and/or hardware accelerators that are shared between multiple radio communication technologies. In some aspects, RF transceiver(s) 808 may include separate RF circuitry sections dedicated to different respective radio communication technologies, and/or RF circuitry sections shared between multiple radio communication technologies. In some aspects, antenna system 806 may include separate antennas dedicated to different respective radio communication technologies, and/or antennas shared between multiple radio communication technologies. Accordingly, antenna system 806, RF transceiver(s) 808, and communication processor 918 can encompass separate and/or shared components dedicated to multiple radio communication technologies.

Communication processor 918 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 918 may be configured to transmit communications including communications (one-way or two-way) between the vehicle 800 and one or more other (target) vehicles in an environment of the vehicle 800 (e.g., to facilitate coordination of navigation of the vehicle 800 in view of or together with other (target) vehicles in the environment of the vehicle 800), or even a broadcast transmission to unspecified recipients in a vicinity of the transmitting vehicle 800.

Communication processor 918 may be configured to operate via a first RF transceiver of the one or more RF transceivers(s) 808 according to different desired radio communication protocols or standards. By way of example, communication processor 918 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 918 may be configured to operate via a second RF transceiver of the one or more RF transceivers(s) 808 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. As a further example, communication processor 918 may be configured to operate via a third RF transceiver of the one or more RF transceivers(s) 808 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 808 may be configured to transmit signals via antenna system 806 over an air interface. The RF transceivers 808 may each have a corresponding antenna element of antenna system 806, or may share an antenna element of the antenna system 806.

Memory 914 may embody a memory component of vehicle 800, such as a hard drive or another such permanent memory device. Although not explicitly depicted in FIGS. 8 and 9, the various other components of vehicle 800, e.g. one or more processors 802, shown in FIGS. 8 and 9 may additionally each include integrated permanent and non-permanent memory components, such as for storing software program code, buffering data, etc.

The antenna system 806 may include a single antenna or multiple antennas. In some aspects, each of the one or more antennas of antenna system 806 may be placed at a plurality of locations on the vehicle 800 in order to ensure maximum RF coverage. The antennas may include a phased antenna array, a switch-beam antenna array with multiple antenna elements, etc. Antenna system 806 may be configured to operate according to analog and/or digital beamforming schemes in order to maximize signal gains and/or provide levels of information privacy. Antenna system 806 may include separate antennas dedicated to different respective radio communication technologies, and/or antennas shared between multiple radio communication technologies. While shown as a single element in FIG. 8, antenna system 806 may include a plurality of antenna elements (e.g., antenna arrays) positioned at different locations on vehicle 800. The placement of the plurality of antenna elements may be strategically chosen in order to ensure a desired degree of RF coverage. For example, additional antennas may be placed at the front, back, corner(s), and/or on the side(s) of the vehicle 800.

Data acquisition devices 812 may include any number of data acquisition devices and components depending on the requirements of a particular application. This may include:

image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 800 environment and forward the data to the data acquisition processor 914 in order to provide the vehicle with an accurate portrayal of the vehicle's environment. The data acquisition devices 812 may be configured to implement pre-processed sensor data, such as radar target lists or UDAR target lists, in conjunction with acquired data.

Measurement devices 816 may include other devices for measuring vehicle-state parameters, such as a velocity sensor (e.g., a speedometer) for measuring a velocity of the vehicle 800, one or more accelerometers (either single axis or multi-axis) for measuring accelerations of the vehicle 800 along one or more axes, a gyroscope for measuring orientation and/or angular velocity, odometers, altimeters, thermometers, etc. It is appreciated that vehicle 800 may have different measurement devices 816 depending on the type of vehicle it is, e.g., car vs. drone vs. boat.

Position devices 814 may include components for determining a position of the vehicle 800. For example, this may include global position system (GPS) or other global navigation satellite system (GNSS) circuitry configured to receive signals from a satellite system and determine a position of the vehicle 800. Position devices 814, accordingly, may provide vehicle 800 with satellite navigation features.

The one or more memories 804 may store data, e.g., in a database or in any different format, that may correspond to a map. For example, the map may indicate a location of known landmarks, roads, paths, network infrastructure elements, or other elements of the vehicle's 800 environment. The one or more processors 802 may process sensory information (such as images, radar signals, depth information from LIDAR, or stereo processing of two or more images) of the environment of the vehicle 800 together with position information, such as a GPS coordinate, a vehicle's ego-motion, etc., to determine a current location of the vehicle 800 relative to the known landmarks, and refine the determination of the vehicle's location. Certain aspects of this technology may be included in a localization technology such as a mapping and routing model.

The map database (DB) 904 may include any type of database storing (digital) map data for the vehicle 800, e.g., for the control system 900. The map database 904 may include data relating to the position, in a reference coordinate system, of various items, including roads, water features, geographic features, businesses, points of interest, restaurants, gas stations, etc. The map database 904 may store not only the locations of such items, but also descriptors relating to those items, including, for example, names associated with any of the stored features. In some aspects, a processor of the one or more processors 802 may download information from the map database 904 over a wired or wireless data connection to a communication network (e.g., over a cellular network and/or the Internet, etc.). In some cases, the map database 904 may store a sparse data model including polynomial representations of certain road features (e.g., lane markings) or target trajectories for the vehicle 800. The map database 904 may also include stored representations of various recognized landmarks that may be provided to determine or update a known position of the vehicle 800 with respect to a target trajectory. The landmark representations may include data fields such as landmark type, landmark location, among other potential identifiers.

Furthermore, the control system 900 may include a driving model, e.g., implemented in an advanced driving assistance system (ADAS) and/or a driving assistance and automated driving system. By way of example, the control system 900 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 800 may include the control system 900 as also described with reference to FIG. 9. The vehicle 800 may include the one or more processors 802 integrated with or separate from an engine control unit (ECU) which may be included in the mobility system 820 of the vehicle 800. The control system 900 may, in general, generate data to control or assist to control the ECU and/or other components of the vehicle 800 to directly or indirectly control the movement of the vehicle 800 via mobility system 820. The one or more processors 802 of the vehicle 800 may be configured to implement the aspects and methods described herein.

The components illustrated in FIGS. 8 and 9 may be operatively connected to one another via any appropriate interfaces. Furthermore, it is appreciated that not all the connections between the components are explicitly shown, and other interfaces between components may be covered within the scope of this disclosure.

The techniques of this disclosure may also be described in the following examples.

Example 1. An apparatus, comprising: an interface configured to receive raw images of one or more objects across a timeseries of frames corresponding to a movement event from a perspective of a vehicle of interest (VoI); and processing circuitry that is configured to: track a change in intensity or direction information represented in motion vectors (MVs) generated based on the raw images; generate, based on the change in the intensity or direction information, a weight of an influence vector representing a VoI influence on the movement event; and transmit the weight of the influence vector and an identity of the movement event to an assessment system that is configured to utilize the weight of the influence vector in an assessment of the VoI.

Example 2. The apparatus of example 1, wherein the processing circuitry is configured to: determine if the change in intensity or direction information is substantially uniform for the objects across the timeseries of frames; and if the change is substantially uniform, add a penalty weight to the weight of the influence vector representing the VoI influence on the movement event.

Example 3. The apparatus of any of examples 1-2, wherein the processing circuitry is configured to: if the change is not substantially uniform, determine if the change is only for an object, of the one or more objects, that is directly in front of the VoI; and if the change is only for the object that is in front of the VoI, subtract a reward weight from the weight of the influence vector representing the VoI influence on the movement event.

Example 4. The apparatus of any of examples 1-3, wherein the processing circuitry is configured to: if the change is not substantially uniform, determine if the change is only for an object, of the one or more objects, that is directly in front of the VoI; and if the change is not only for the object that is directly in front of the VoI, add a penalty weight to the weight of the influence vector representing the VoI influence on the movement event.

Example 5. The apparatus of any of examples 1-4, wherein the assessment system comprises a driver scoring engine, and the processing circuitry is configured to transmit the influence vector to a driver scoring engine to qualify a driver score based on an event associated with the movement event.

Example 6. The apparatus of any of examples 1-5, wherein the movement event is selected from a group of movement events consisting of: braking, acceleration, and maneuvering of the VoI or of the one or more objects.

Example 7. The apparatus of any of examples 1-6, wherein if respective positions of the one or more objects is substantially similar across the timeseries of frames, the change in intensity information represented in the MVs is substantially close to zero.

Example 8. The apparatus of any of examples 1-7, wherein the processing circuitry is configured to: if there is the change in intensity information represented in the MVs for each of the objects, determine that the movement event is the VoI accelerating or decelerating, and add a penalty weight to the weight of the influence vector representing the VoI influence on the movement event.

Example 9. The apparatus of any of examples 1-8, wherein the processing circuitry is configured to: if only an object, of the one or more objects, that is directly in front of the VoI has a change in the intensity information represented in the MVs, and the VoI is traveling at a constant speed, determine that the movement event is the object that is directly in front of the VoI accelerating or decelerating, and subtract a reward weight from the weight of the influence vector representing the VoI influence on the movement event.

Example 10. The apparatus of any of examples 1-9, wherein the processing circuitry is configured to: if the one or more objects has a change in intensity information represented in the MVs, and the VoI is traveling at a constant speed, determine that the movement event is a general traffic slowdown, and subtract a reward weight from the weight of the influence vector representing the VoI influence on the movement event.

Example 11. The apparatus of any of examples 1-10, wherein the processing circuitry is configured to: if the change in direction information represented in the MVs is substantially completely in a left direction or substantially completely a right direction across the timeseries of frames for the one or more objects, determine that the movement event is unsafe maneuvering by the VoI, and add a penalty weight to the weight of the influence vector representing the VoI influence on the movement event.

Example 12. The apparatus of any of examples 1-11, wherein the processing circuitry is configured to: normalize different intensity or direction information represented in MVs from different VoIs or road conditions based on factors selected from a group of factors consisting of: camera frame rate, number of frames across which the movement event is formed, and a speed limit for a road segment.

Example 13. The apparatus of any of examples 1-12, wherein the processing circuitry is configured to test an artificial intelligence vision model of an autonomous vehicle.

Example 14. An apparatus, comprising: an interface means for receiving raw images of one or more objects across a timeseries of frames of a movement event from a perspective of a vehicle of interest (VoI); and processing means for: tracking a change in intensity or direction information represented in motion vectors (MVs) generated based on the raw images; generating, based on the change in the intensity or direction information, a weight of an influence vector representing a VoI influence on the movement event; and transmitting the weight of the influence vector and an identity of the movement event to an assessment system that is configured to utilize the weight of the influence vector in an assessment of the VoI.

Example 15. The apparatus of example 14, wherein the processing means is for: determining if the change in intensity or direction information is substantially uniform for the objects across the timeseries of frames; and if the change is substantially uniform, adding a penalty weight to the weight of the influence vector representing the VoI influence on the movement event.

Example 16. The apparatus of any of examples 14-15, wherein the processing means is for: if the change is not substantially uniform, determining if the change is only for an object, of the one or more objects, that is directly in front of the VoI; and if the change is only for the object that is in front of the VoI, subtracting a reward weight from the weight of the influence vector representing the VoI influence on the movement event.

Example 17. The apparatus of any of examples 14-16, wherein the processing means is for: if the change is not substantially uniform, determining if the change is only for an object, of the one or more objects, that is directly in front of the VoI; and if the change is not only for the object that is directly in front of the VoI, adding a penalty weight to the weight of the influence vector representing the VoI influence on the movement event.

Example 18. The apparatus of any of examples 14-17, wherein the assessment system comprises a driver scoring engine, and the processing means is for transmitting the influence vector to a driver scoring engine to qualify a driver score based on an event associated with the movement event.

Example 19. The apparatus of any of examples 14-18, wherein the processing means is for: if the change in direction information represented in the MVs is substantially completely in a left direction or substantially completely a right direction across the timeseries of frames for the one or more objects, determining that the movement event is unsafe maneuvering by the VoI, and adding a penalty weight to the weight of the influence vector representing the VoI influence on the movement event.

Example 20. A non-transitory computer-readable medium having stored thereon instructions that, when executed by processing circuitry, cause the processing circuitry to: track a change in intensity or direction information represented in motion vectors (MVs) generated based on raw images of one or more objects across a timeseries of frames of a movement event from a perspective of a vehicle of interest (VoI); generate, based on the change in the intensity or direction information, a weight of an influence vector representing a VoI influence on the movement event; and transmit the weight of the influence vector and an identity of the movement event to an assessment system that is configured to utilize the weight of the influence vector in an assessment of the VoI.

Example 21. The non-transitory computer-readable medium of example 20, wherein the instructions further cause the processing circuitry to: determine if the change in intensity or direction information is substantially uniform for the objects across the timeseries of frames; and if the change is substantially uniform, add a penalty weight to the weight of the influence vector representing the VoI influence on the movement event.

Example 22. The non-transitory computer-readable medium of any of examples 20-21, wherein the instructions further cause the processing circuitry to: if the change is not substantially uniform, determine if the change is only for an object, of the one or more objects, that is directly in front of the VoI; and if the change is only for the object that is in front of the VoI, subtract a reward weight from the weight of the influence vector representing the VoI influence on the movement event.

Example 23. The non-transitory computer-readable medium of any of examples 20-22, wherein the instructions further cause the processing circuitry to: if the change is not substantially uniform, determine if the change is only for an object, of the one or more objects, that is directly in front of the VoI; and if the change is not only for the object that is directly in front of the VoI, add a penalty weight to the weight of the influence vector representing the VoI influence on the movement event.

Example 24. The non-transitory computer-readable medium of any of examples 20-23, wherein the assessment system comprises a driver scoring engine, and the instructions further cause the processing circuitry to transmit the influence vector to a driver scoring engine to qualify a driver score based on an event associated with the movement event.

Example 25. The non-transitory computer-readable medium of any of examples 20-24, wherein the instructions further cause the processing circuitry to: if the change in direction information represented in the MVs is substantially completely in a left direction or substantially completely a right direction across the timeseries of frames for the one or more objects, determine that the movement event is unsafe maneuvering by the VoI, and add a penalty weight to the weight of the influence vector representing the VoI influence on the movement event.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An apparatus, comprising:

an interface configured to receive raw images of one or more objects across a timeseries of frames corresponding to a movement event from a perspective of a vehicle of interest (VoI); and processing circuitry that is configured to:

track a change in intensity or direction information represented in motion vectors (MVs) generated based on the raw images;

generate, based on the change in the intensity or direction information, a weight of an influence vector representing a VoI influence on the movement event by:

determining if the change in intensity or direction information is substantially uniform for the objects across the timeseries of frames;

if the change is substantially uniform, adding a penalty weight to the weight of the influence vector representing the VoI influence on the movement event;

if the change is not substantially uniform, determining if the change is only for an object, of the one or more objects, that is directly in front of the VoI; and if the change is only for the object that is in front of the VoI, subtracting a reward weight from the weight of the influence vector representing the VoI influence on the movement event; and transmit the weight of the influence vector and an identity of the movement event to an assessment system that is configured to utilize the weight of the influence vector in an assessment of the VoI.

2. The apparatus of claim 1, wherein the processing circuitry is configured to:

determine if the change is only for an object, of the one or more objects, that is directly in front of the VoI; and if the change is not only for the object that is directly in front of the VoI, add a penalty weight to the weight of the influence vector representing the VoI influence on the movement event.

3. The apparatus of claim 1, wherein the assessment system comprises a driver scoring engine, and the processing circuitry is configured to transmit the influence vector to a driver scoring engine to qualify a driver score based on an event associated with the movement event.

4. The apparatus of claim 1, wherein the movement event is selected from a group of movement events consisting of: braking, acceleration, and maneuvering of the VoI or of the one or more objects.

5. The apparatus of claim 1, wherein if respective positions of the one or more objects is substantially similar across the timeseries of frames, the change in intensity information represented in the MVs is substantially close to zero.

6. The apparatus of claim 1, wherein the processing circuitry is configured to:

if there is the change in intensity information represented in the MVs for each of the objects, determine that the movement event is the VoI accelerating or decelerating, and add a penalty weight to the weight of the influence vector representing the VoI influence on the movement event.

7. The apparatus of claim 1, wherein the processing circuitry is configured to:

if only an object, of the one or more objects, that is directly in front of the VoI has a change in the intensity information represented in the MVs, and the VoI is traveling at a constant speed, determine that the movement event is the object that is directly in front of the VoI accelerating or decelerating, and subtract a reward weight from the weight of the influence vector representing the VoI influence on the movement event.

8. The apparatus of claim 1, wherein the processing circuitry is configured to:

if the one or more objects has a change in intensity information represented in the MVs, and the VoI is traveling at a constant speed, determine that the movement event is a general traffic slowdown, and subtract a reward weight from the weight of the influence vector representing the VoI influence on the movement event.

9. The apparatus of claim 1, wherein the processing circuitry is configured to:

if the change in direction information represented in the MVs is substantially completely in a left direction or substantially completely a right direction across the timeseries of frames for the one or more objects, determine that the movement event is unsafe maneuvering by the VoI, and add a penalty weight to the weight of the influence vector representing the VoI influence on the movement event.

10. The apparatus of claim 1, wherein the processing circuitry is configured to:

normalize different intensity or direction information represented in MVs from different VoIs or road conditions based on factors selected from a group of factors consisting of: camera frame rate, number of frames across which the movement event is formed, and a speed limit for a road segment.

11. The apparatus of claim 1, wherein the processing circuitry is configured to test an artificial intelligence vision model of an autonomous vehicle.

12. A non-transitory computer-readable medium having stored thereon instructions that, when executed by processing circuitry, cause the processing circuitry to:

track a change in intensity or direction information represented in motion vectors (MVs) generated based on raw images of one or more objects across a timeseries of frames of a movement event from a perspective of a vehicle of interest (VoI);

generate, based on the change in the intensity or direction information, a weight of an influence vector representing a VoI influence on the movement event by:

determining if the change in intensity or direction information is substantially uniform for the objects across the timeseries of frames;

if the change is substantially uniform, adding a penalty weight to the weight of the influence vector representing the VoI influence on the movement event;

if the change is not substantially uniform, determining if the change is only for an object, of the one or more objects, that is directly in front of the VoI; and if the change is only for the object that is in front of the VoI, subtracting a reward weight from the weight of the influence vector representing the VoI influence on the movement event; and transmit the weight of the influence vector and an identity of the movement event to an assessment system that is configured to utilize the weight of the influence vector in an assessment of the VoI.

13. The non-transitory computer-readable medium of claim 12, wherein the instructions further cause the processing circuitry to:

determine if the change is only for an object, of the one or more objects, that is directly in front of the VoI; and if the change is not only for the object that is directly in front of the VoI, add a penalty weight to the weight of the influence vector representing the VoI influence on the movement event.

14. The non-transitory computer-readable medium of claim 12, wherein the assessment system comprises a driver scoring engine, and the instructions further cause the processing circuitry to transmit the influence vector to a driver scoring engine to qualify a driver score based on an event associated with the movement event.

15. The non-transitory computer-readable medium of claim 12, wherein the instructions further cause the processing circuitry to:

if the change in direction information represented in the MVs is substantially completely in a left direction or substantially completely a right direction across the timeseries of frames for the one or more objects, determine that the movement event is unsafe maneuvering by the VoI, and add a penalty weight to the weight of the influence vector representing the VoI influence on the movement event.

* * * * *